(12) United States Patent
Salahshour et al.

(10) Patent No.: US 6,181,332 B1
(45) Date of Patent: Jan. 30, 2001

(54) METHOD AND SYSTEM FOR CONTEXTUAL PRESENTATION OF A TEMPORAL BASED OBJECT ON A DATA PROCESSING SYSTEM

(75) Inventors: Abdolreza Salahshour, Keller; Marvin L. Williams, Lewisville, both of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 08/143,687

(22) Filed: Oct. 28, 1993

(51) Int. Cl.[7] .................................................. G06F 17/21
(52) U.S. Cl. ............................................. 345/302; 345/335
(58) Field of Search ................................... 395/144–147, 395/153–155, 159; 345/302, 335

(56) References Cited

U.S. PATENT DOCUMENTS 5,341,293 * 8/1994 Vertelney et al. .............. 364/419.17
5,375,200 * 12/1994 Dugan et al. ........................ 395/159

OTHER PUBLICATIONS

Erik Hoffert et al. "Quicktime™: An Extensible Standard for Digital Multimedia" COMPCON '92 IEEE Computer Society Int'l . Conf., p 15–20, Feb. 24–28, 1992.*

Wan–teh, Chang et al. "Call Processing and Signaling in a Desktop Multimedia Conferencing System" GlobeCOM '92, IEEE Globel Telecomm. Conf. record, p. 225–9 vol. 1, Dec 6–9, 1992.*

Rangan et al, "A Window–Based Editor for Digtal Video and Audio", System Sciences, 1992, IEEE pp. 640–648.*

* cited by examiner

Primary Examiner—Joseph H. Feild
(74) Attorney, Agent, or Firm—Geoffrey A. Mantooth

(57) ABSTRACT

Temporal based objects, such as video or audio objects, are presented in a manner that is determined by the context through which the object is presented. When presented through one context, the object is presented in accordance with one set of presentation characteristics. When presented through another context, the object is presented in accordance with another set of presentation characteristics. A context can be an application program such as a calendar program or an inbasket program, or a context can be an output device such as a video monitor. Presentation characteristics determine which segments of an object are to be presented and how they are to be presented (such as by playing, pause play, fast forward, fast forward play, rewind, rewind play and stop play).

22 Claims, 9 Drawing Sheets

METHOD AND SYSTEM FOR CONTEXTUAL PRESENTATION OF A TEMPORAL BASED OBJECT ON A DATA PROCESSING SYSTEM

TECHNICAL FIELD OF THE INVENTION

The present invention relates to methods and systems for controlling the presentation of temporal based objects on a data processing systems, which objects include audio objects and video objects.

BACKGROUND OF THE INVENTION

Data processing systems contain various objects. Examples of objects include application programs (such as word processing programs), documents (such as the electronic representation of this specification) and temporal based objects. Temporal based objects include those objects that have data or a data stream that is presented over some duration of time. Examples of temporal based objects include audio objects and video objects. An audio object has a data stream of speech, music, etc., that is presented to a user through a speaker. If the object is a video object, then the data stream is presented to the user over a video monitor. A video object may also include an audio component that is presented to the user by a speaker. Unlike the presentation of a document on a computer screen, where the presentation is static (except for scrolling), the data in the data stream of a temporal based object is presented to an output device at some rate of time. This allows for dynamic presentations of information.

The availability of temporal based objects is becoming more widespread. For example, with the advent of electronic distributions, such as electronic mail, temporal based objects can be distributed to a plurality of users.

These temporal based objects can be long in duration. Often times, there is only one segment that is of interest to a recipient user. Static objects, such as a textual document, can be skimmed by a user to find the segments of interest. However, temporal based objects are not easily skimmed for content. Therefore, a recipient user must view or hear more of the object presentation than is necessary.

Thus, it is desirable to tailor the presentation of a temporal based object to the needs of a recipient. The needs of a recipient can frequently be assessed according to the context of the presentation of the temporal based object. For example, the originator of a temporal based object that provides a meeting notice may wish for one segment of the object to be presented to a calendar user (that is, a user who receives a presentation of the object through a calendar application on the user's data processing system), while another segment of the same object to be presented to an inbasket user.

SUMMARY OF THE INVENTION

It is an object of the present invention to provide a method and system that allows the presentation of a temporal based object to be specified based upon the context of the presentation.

The method and system of the present invention presents a temporal based object on a data processing system. The context for presenting the object is determined. Presentation characteristics of the object are provided and associated with the object. A determination is made if the object is to be presented through the context. If the object is to be presented through the context, then the object is presented in accordance with the presentation characteristics.

The present invention allows the presentation of a temporal based object to be governed by the context through which the object is presented. In accordance with one aspect of the present invention, the context for presenting the object comprises an application program. In another aspect of the present invention, the context for presenting the object is an output device of a data processing system.

In accordance with another aspect of the present invention, the object has a data stream for presentation to a user. The provision of presentation characteristics of the object comprises selecting a segment of the data stream to be presented. In addition, the provision of presentation characteristics of the object comprises determining how the segment of the data stream is to be presented. The determination of how the segment of the data stream is to be presented further comprises providing a presentation behavior of the segment, with the presentation behavior taken from the group of behaviors consisting of play, pause play, rewind, fast forward, rewind play, fast forward play and stop play.

In accordance with another aspect of the present invention, before the object is presented in accordance with the presentation characteristics, it is determined if the determination of a context for presenting the object and the provision of presentation characteristics for the object have been authorized.

In still another aspect of the present invention, the provision of presentation characteristics of the object comprises providing that the object will be presented in a pause play mode. The object is presented in the pause play mode. After a predetermined amount of time has elapsed, the presentation of the object stopped.

The present invention allows a user to easily distribute temporal based objects such as multimedia objects (for example, video objects). The present invention is useful to organizations that distribute temporal based objects.

The present invention allows an object to be edited for presentation, without the need for editing the object itself. The user need not cut and paste segments of the object in order to convey different information to different applications. Instead, the user determines the context and the presentation characteristics for the object by registration. These presentation characteristics are provided as attributes within or in conjunction with the object. Then, the object is distributed to the context. Distribution may be to the same user (the originating user), wherein the object is located within the selected context, or distribution may be to another user (the recipient user). To present the object, a user selects the object or the context containing the object. The object is then presented in accordance with the presentation characteristics.

BRIEF DESCRIPTION OF THE DRAWINGS

FIGS. 2a through 5 are flow charts of the present invention, in accordance with a preferred embodiment. FIGS. 2a–2c show the registration method. FIG. 4 shows the method for distributing an object and posting that object to a specified context. FIG. 5 shows the method for invoking the activation of an object in its context.

DESCRIPTION OF THE INVENTION

Figure 1:
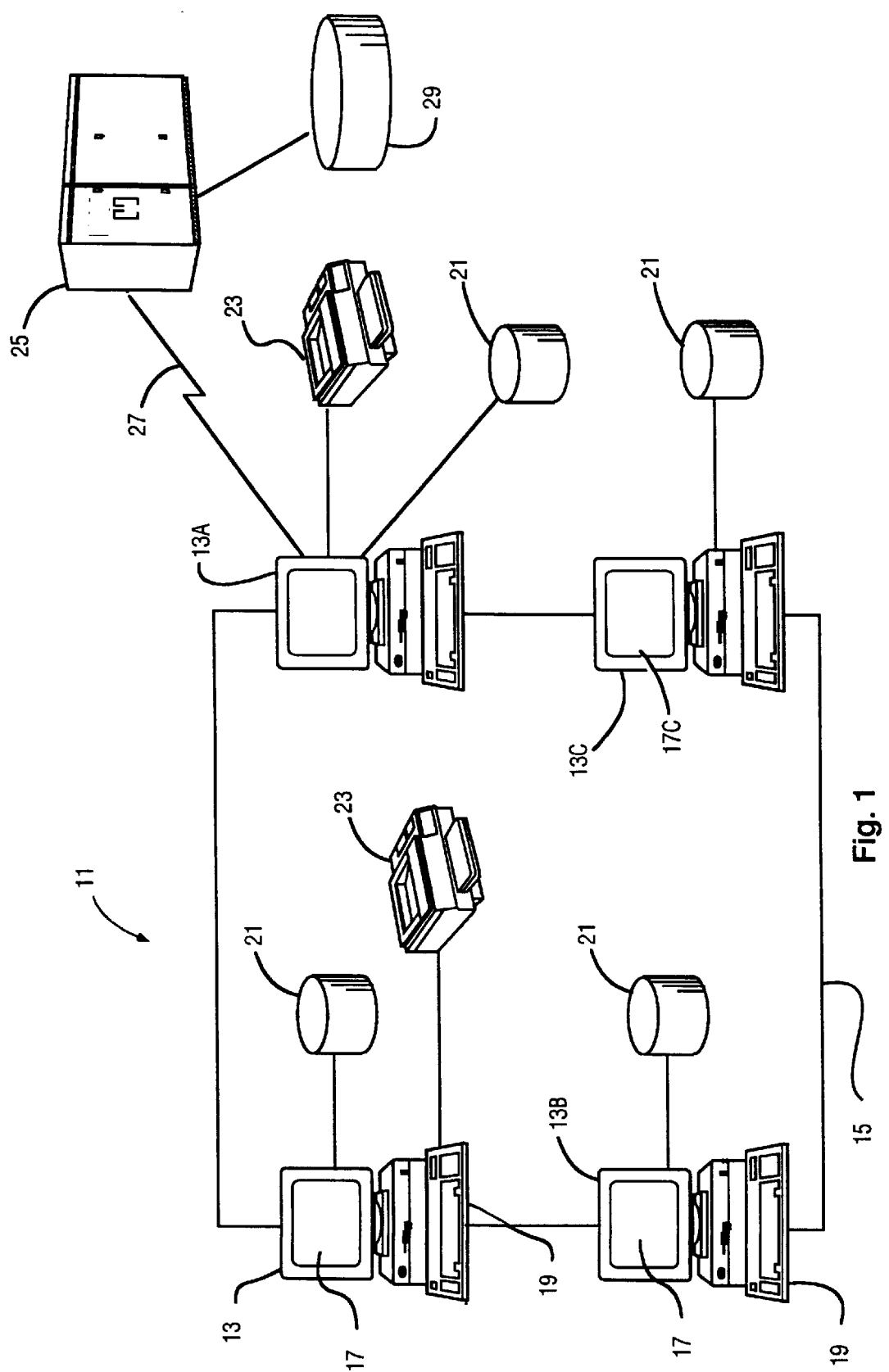
FIG. 1 is a schematic view of a network of data processing systems, upon which the present invention can be practiced.

In FIG. 1, there is shown a schematic diagram of a network of data processing systems, upon which the present invention can be practiced. The network 11 includes plural individual computers, workstations or data processing systems 13, 13A, 13B, 13C which are connected together in a local area network (LAN) 15. Each computer 13 (referred to generically as 13 unless otherwise specified) includes a user interface, which has a display screen 17, a speaker (or speakers) located inside of the computer, and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user within the data processing system 11. The present invention can be implemented on an individual or plural computers 13.

Each computer 13 has the capability of presenting temporal based objects such as multimedia objects. For example, the screen 17 of each computer 13 can present video objects. One or more speakers (not shown) are provided inside of each computer 13. Audio portions of objects are presented by the speakers.

The network 11 may also include a mainframe or host computer 25 that is coupled to one of the computers 13A by a communication link 27. The host computer 25 may also be coupled to a storage device 29 which may serve as a remote storage for the computers.

The present invention allows a user to provide that the presentation of a temporal based object is controlled by the context through which the object is being presented.

For example, suppose that a first user of one computer 13 (see FIG. 1) composes a video object. The video object is relatively long and has three segments, namely segment A, segment B and segment C. If the object is presented from start to finish, segment A is presented first, followed by segment B, with segment C being presented last. After the first user completes the object, the first user wishes to electronically distribute the object to a second user at computer 13A, to a third user at computer 13B and to a fourth user at computer 13C. The first user wishes to send the object to the calendar application of the second user's computer 13A. The first user believes that the second user need only view segment A to obtain the necessary information. In addition, the first user wishes to send the object to the inbasket application of the third user's computer 13B. The first user believes that the third user need only view segments B and C of the object. In addition, the first user wishes to send the object to the video monitor 17C of the fourth user. Upon selection of the object by the first user, the object is rewound to the beginning of segment A and all three segments A, B and C are then played.

Figure 2A:
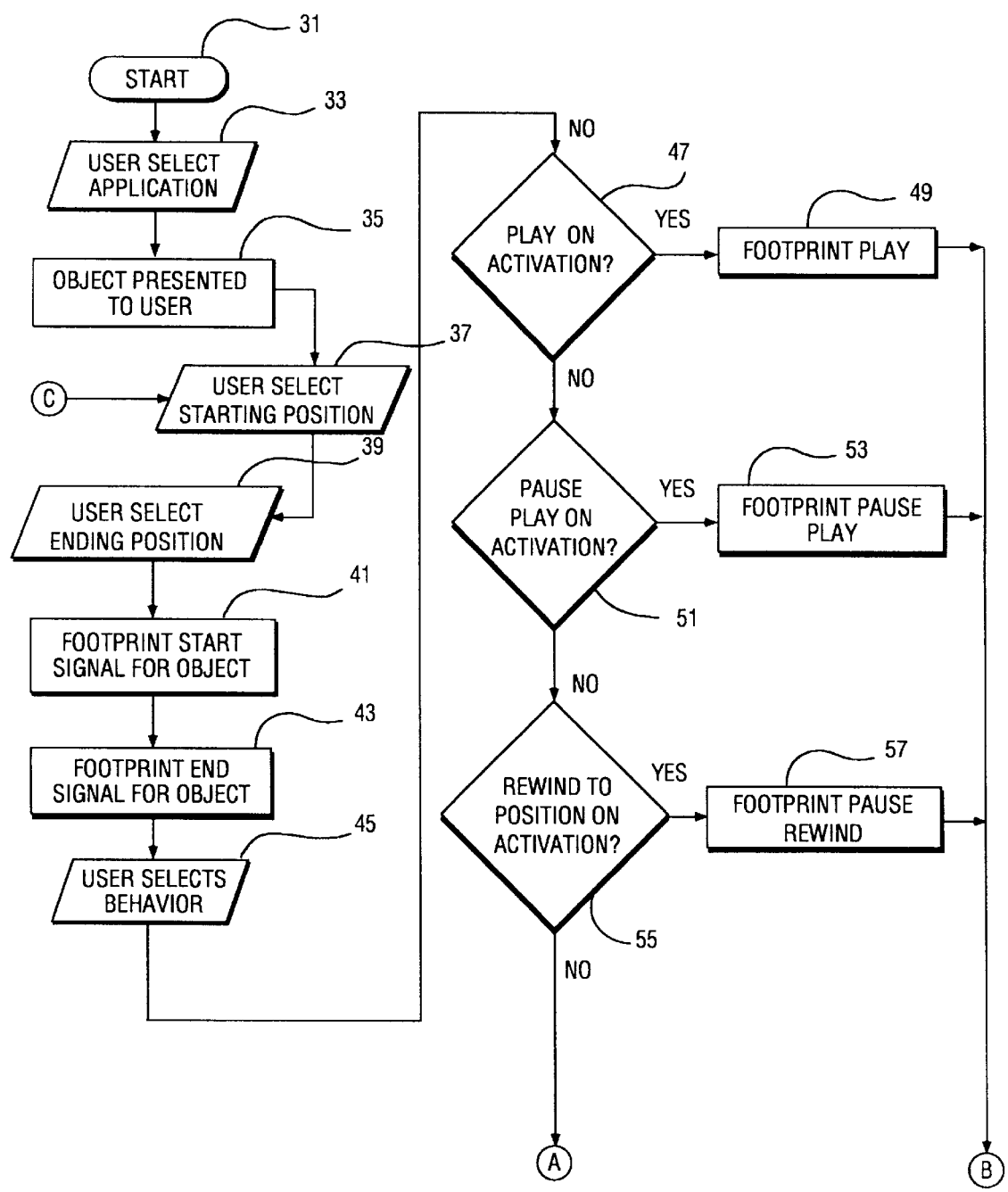
Figure 2B:
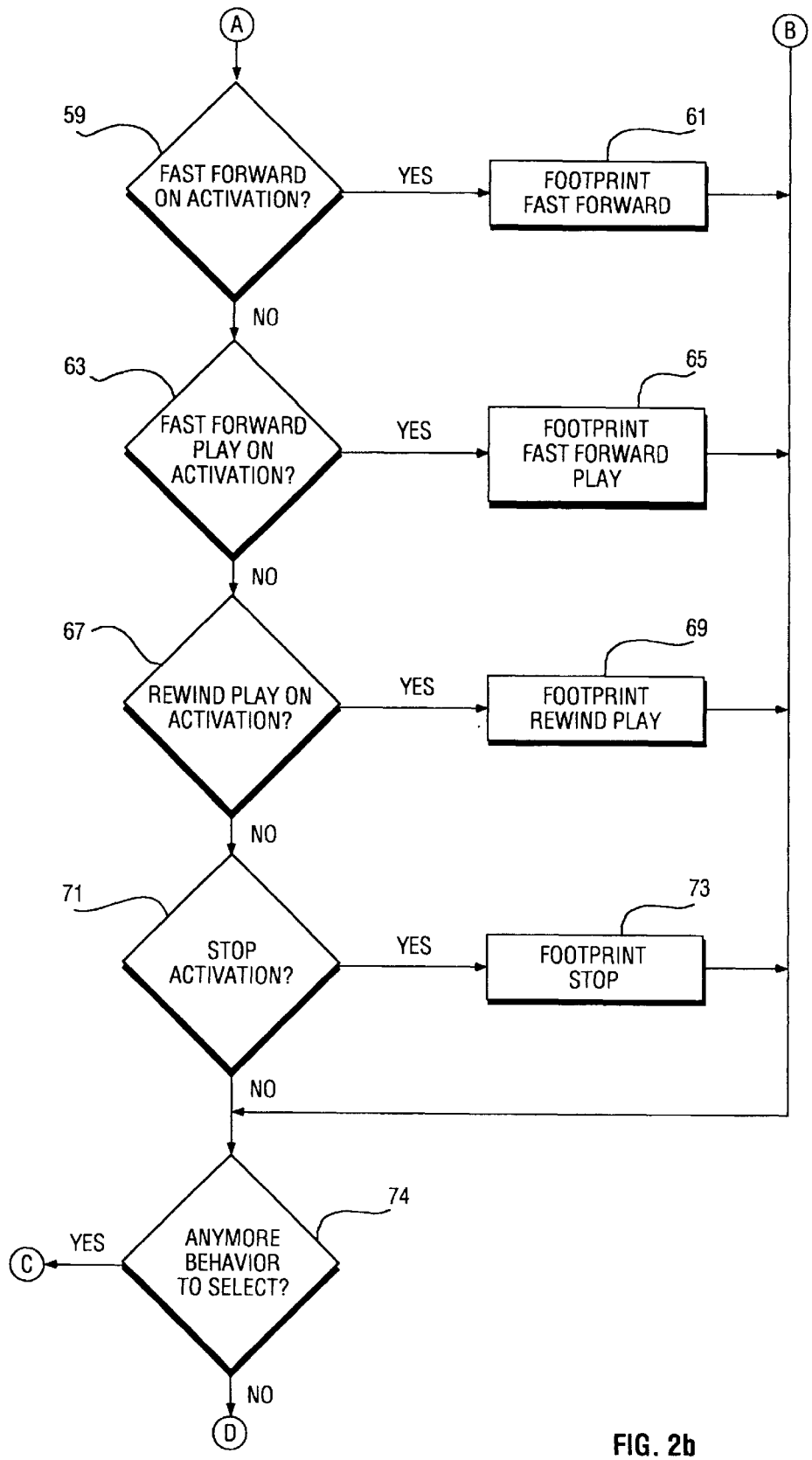
Figure 2C:
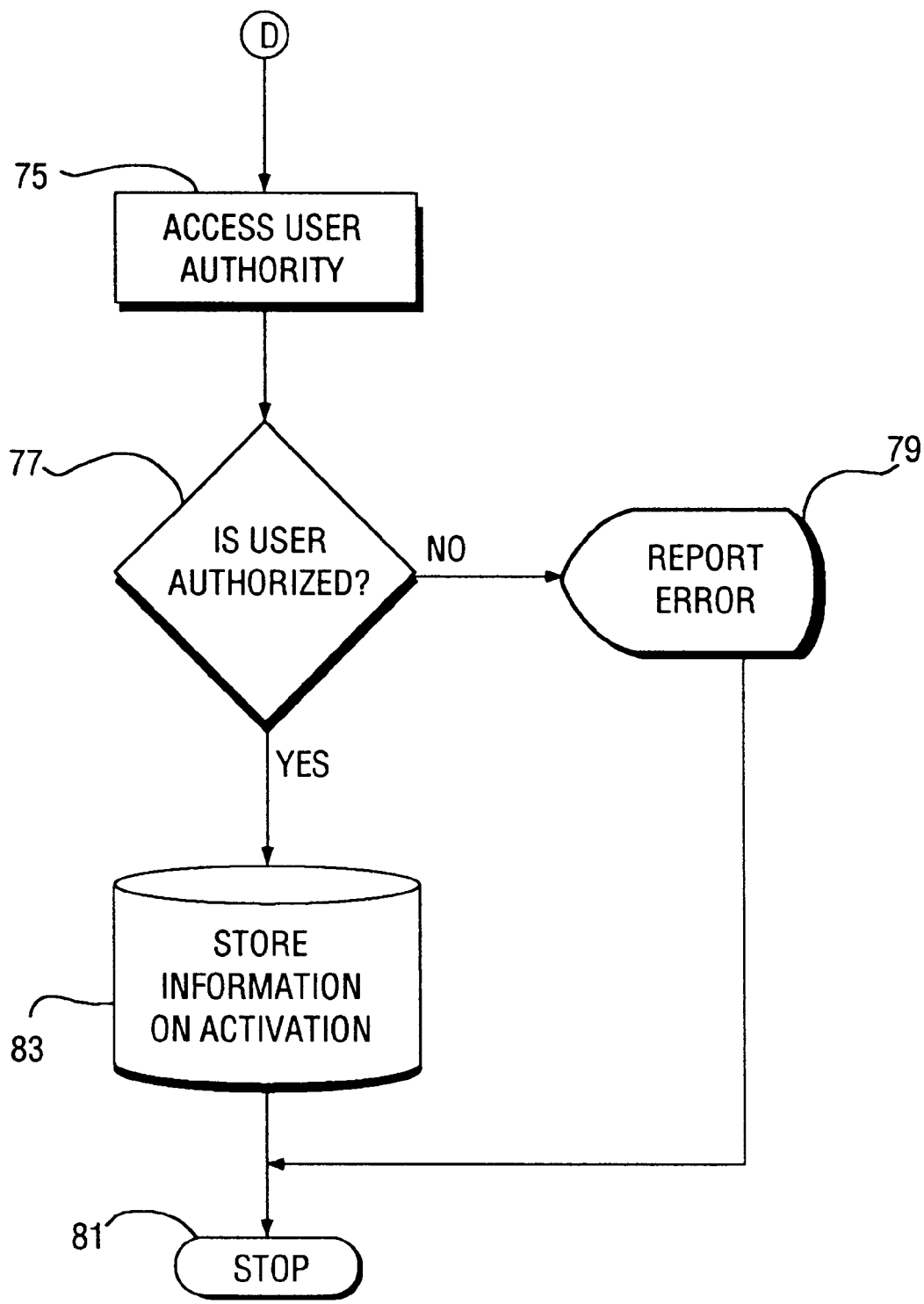

The first user registers the context and presentation characteristics for each distribution using the registration method of FIGS. 2a–2c. For the distribution to the second user, the first user specifies that the context is a calendar program and that segment A is to be played. For the distribution to the third user, the first user specifies that the context is an inbasket program and that segments B and C are to be played. For the distribution to the fourth user, the first user specifies that the context is a video monitor or player and that segments A, B and C are to be played.

Figure 4:
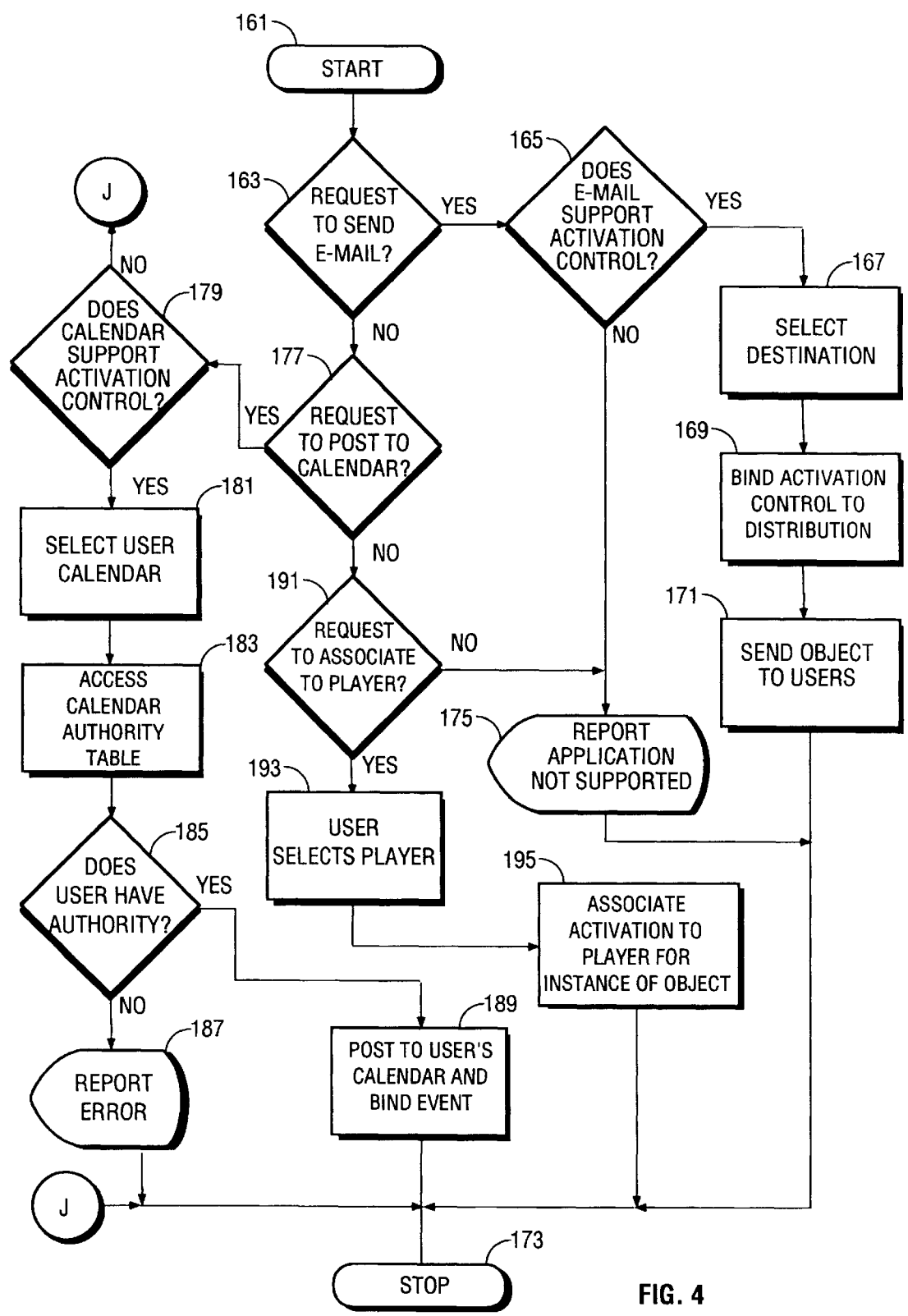

The first user then distributes the object to each of the second, third and fourth users. The first user could distribute (or place) the object to an application or other context on the first user's own computer 13. The flow chart of FIG. 4 illustrates how an object is distributed to selected exemplary applications in a computer. Distribution could occur using a conventional electronic mail service, via the local area network 15. Alternatively, the first user could merely put the object on floppy disks and deliver the disks to the second, third and fourth users. The second, third and fourth users would then load the object onto their respective computers.

Figure 5:
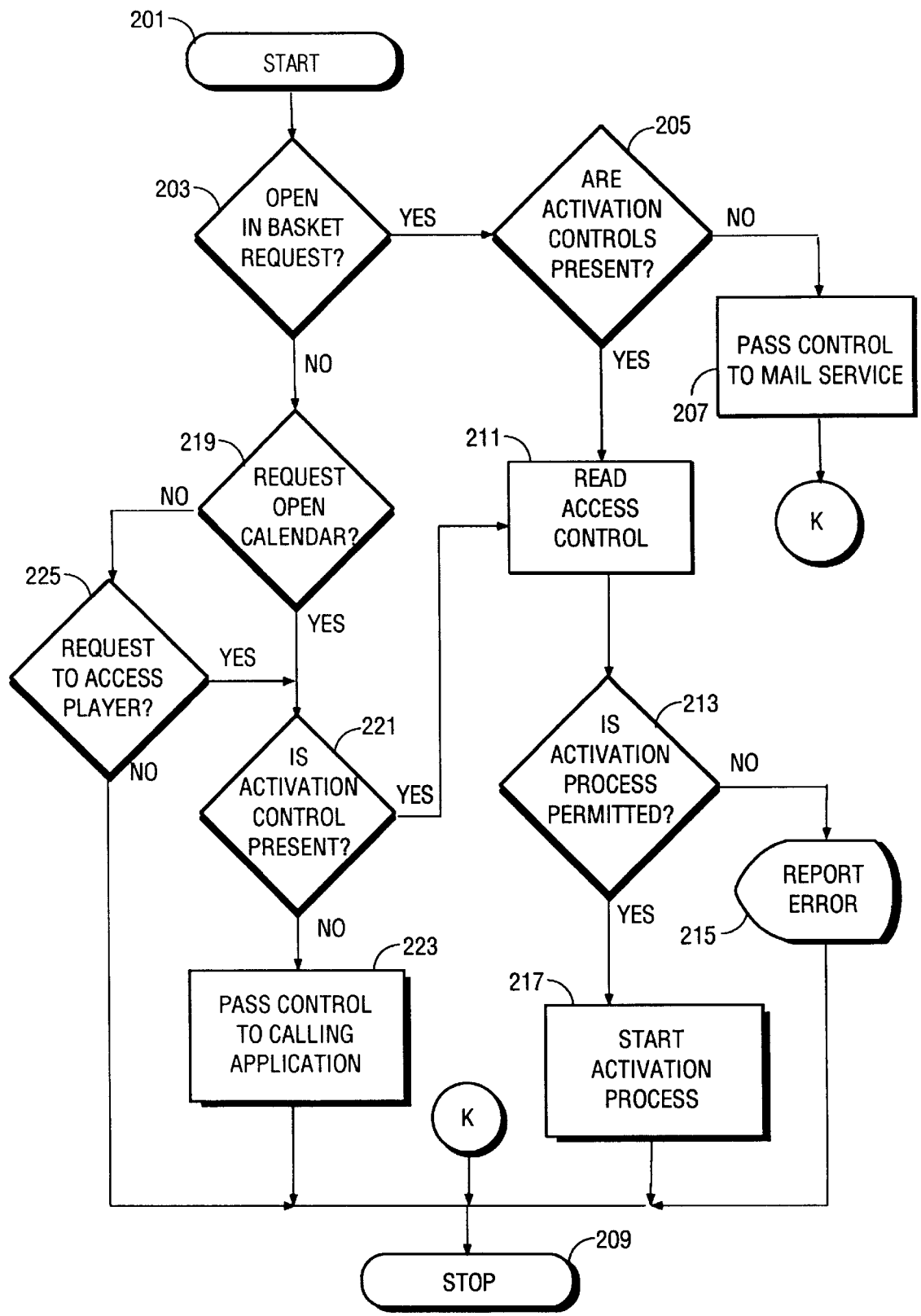

When the second user accesses the calendar program on the computer 13A, the video object is available. The flow chart of FIG. 5 illustrates how the context invokes the activation method of FIGS. 3a–3c. The second user selects the object for presentation, wherein only segment A is presented. Segments B and C are not presented. The activation method of FIGS. 3a–3c activates only segment A for presentation.

When the third user accesses the inbasket program on the computer 13B, the video object is available. The flow chart of FIG. 5 illustrates how the context invokes the activation method of FIGS. 3a–3c. The third user selects the object for presentation, wherein segment A is not presented at all, but segments B and C are presented. The activation method of FIGS. 3a–3c activates only segments B and C for presentation.

When the fourth user accesses the video monitor 17C, the video object is available. The flow chart of FIG. 5 shows the invocation of the activation method of FIGS. 3a–3c upon the accessing of the video monitor 17C. The activation method activates all of the segments for presentation.

Thus, the context of the presentation (that is presenting the object through a calendar or an inbasket) determines the presentation characteristics of the object. The presentation characteristics determine which portion or portions of the object are to be presented and how those portions are presented.

Referring now to FIGS. 2a through 3b, the flow charts will now be described. In the flow charts, the following graphical conventions are observed: a rectangle for either a process or function, a diamond for a decision, a parallelogram for an input from a user, a five sided display symbol for displaying or providing information to a user and a circle for an off-page connector. These conventions are well understood by programmers skilled in the art of user interfaces and the flow charts are sufficient to enable a programmer skilled in the art to write code in any suitable computer programming language, such as ASSEMBLER, PASCAL or C for a computer such as the IBM Personal System/2 (PS/2) family of computers which supports these languages. (IBM and Personal System/2 are trademarks of International Business Machines Corporation.)

Referring now to FIGS. 2a–2c, the registration method will be described. The registration method of FIGS. 2a–2c allows a user to determine the context through which the temporal based object is to be presented, and the presentation characteristics of the object (that is, which portion of the object is to be presented and the method of presentation of that portion). In FIG. 2a, the method is started when invoked by a user, step 31. Invocation can be, for example, by the user pressing an appropriate key on the keyboard 19 (FIG. 1). After the method has been invoked, the user selects the name of the application or the context through which the temporal based object will be presented, step 33. For example, the user could select that the application is a calendar program.

In the next few steps, the user selects the portion of the object that is to be presented. The temporal based object is presented to the user, step 35, to assist the user in selecting the portion that is to be presented. The user selects the position for starting activation, step 37. The starting position may be selected during the presentation of the object. The user then selects the position for ending activation, step 39. The starting and ending positions can be specified in many ways. For example, while the object is being presented, the user can press a key or click a mouse button at the desired location or position. Alternatively, the user can specify a position by time units, for example, two minutes from the beginning of the presentation or thirty seconds from the last specified position, or by arbitrary units, for example, 300 units from the beginning of the presentation.

In step 41, a footprint start signal is provided at the selected start position. In step 43, a footprint end signal is provided at the selected end position. The footprint signals are binary signals that are inserted into the data stream of the presentable information within the object to identify the respective starting and ending positions.

In step 45, the user selects the type of presentation behavior. The next several steps determine the type of presentation behavior that is specified by the user. In step 47, the method determines if the behavior is play upon activation. Play behavior causes the object to play in a normal fashion. If the result of step 47 is YES, then in step 49, the method provides a footprint signal of play.

If the result of step 47 is NO, then the method proceeds to step 51 to determine if the behavior is pause play upon activation. Pause play behavior causes the object to provide a static presentation. For example, in a video object, pause play results in only one frame being displayed. In essence, the provision of the data stream of the object to the output device is halted and static. If the result of step 51 is YES, then in step 53, the method provides a footprint signal of pause play.

If the result of step 51 is NO, then the method proceeds to step 55 to determine if the behavior is rewind upon activation. Rewind behavior causes the object to quickly return to a selected position, such as the beginning. For example, rewind behavior can be used if a user wishes to always view an object at the beginning, regardless of where the user stopped viewing the object last. If the result of step 55 is YES, then in step 57, the method provides a footprint signal of rewind.

If the result of step 55 is NO, then the method proceeds to step 59, FIG. 2b, to determine if the behavior is fast forward upon activation. This is shown by connector "A" at the bottom of FIG. 2a and the top of FIG. 2b. Fast forward behavior causes the object to quickly advance to a selected position. If the result of step 59 is YES, then in step 61, a fast forward footprint signal is provided.

If the result of step 59 is NO, then the method proceeds to step 63 to determine if the behavior is fast forward play upon activation. Fast forward play behavior causes the information in the object to be played or presented at a fast speed (that is faster than in normal play). If the result of step 63 is YES, then in step 65, a fast forward play footprint is provided.

If the result of step 63 is NO, then the method proceeds to step 67 to determine if the behavior is rewind play upon activation. Rewind play behavior causes the information in the object to be played or presented backwards at normal speed. Alternatively, rewind play behavior can provide that the information is presented backwards at an advanced or faster speed. If the result of step 67 is YES, then in step 69, then in step 69, a rewind play footprint is provided.

If the result of step 67 is NO, then the method proceeds to step 71 to determine if stop behavior has been selected by the user. Stop behavior presumes that the object is being presented, wherein stop behavior causes the presentation to cease. Stop behavior is useful if the object is a continuous play object. If the result of step 71 is YES, then in step 73, a stop footprint is provided.

If the result of step 71 is NO, then the method proceeds to step 74. After each of steps 49, 53, 57 (see FIG. 2a), 61, 65, 69 and 73 (see FIG. 2b) have been performed, the method proceeds to step 74.

Of course, playing characteristics other than play, rewind, etc. could be provided for. For example, with a video object, "audio only" behavior would present the audio portion to a user, without presenting the visual portion. Also, slow behavior would present the object at a slower than normal speed in either the forward or reverse directions.

In step 74, the method determines if the user wishes to select any more behaviors. If the result of step 74 is YES, then the method returns to step 37 of FIG. 2a (by way of connector "C") to allow the user to select additional starting and ending positions, as well as another behavior. Of course, the same starting and ending positions could be selected by the user. If the result of step 74 is NO, then the method proceeds to step 75 of FIG. 2c (by way of connector "D").

In step 75, the authority of the user to specify presentation characteristics and context is accessed. User authority may be provided by a table located on a data base that is accessible by the user's computer. As an example of user authority, an originator of an object may not wish for a recipient to alter the presentation characteristics provided in step 45. By denying the recipient proper user authority, the recipient is unable to alter the contextual presentation. In step 77, the method determines if the user has authority from the information accessed in step 75. If the result of step 77 is NO, then in step 79, an error is reported to the user. The method then stops, step 81.

If the result of step 77 is YES, then in step 83, the context, starting and ending positions and behavioral information is stored. This information can be stored within the object data stream that is to be presented. For example, at the start location within the data, a footprint containing the start signal and the behavior signal would be provided. Alternatively, this information can be stored in a binding that is not located within the data stream of the object, but is separate from the object, or is an attribute of the object. After step 83, the method stops, step 81.

After the object has been registered using the method of FIGS. 2a–2c, it is ready for distribution so as to be contextually presented. Distribution can be to another user. In addition, the originating user can "distribute" or place the object in a context on the originator's computer. Distribution can be over the local area network 15, or by other methods. As an example, if the object is meant to be presented through a recipient's calendar application, then the distribution targets the object for this application. Thus, when the recipient opens the calendar application, the object will be made available. A representation of the object, such as an icon, is located on a specific day or time of the calendar application. The distribution of an object will be discussed in more detail hereinafter, with reference to FIG. 4.

Figure 3A:
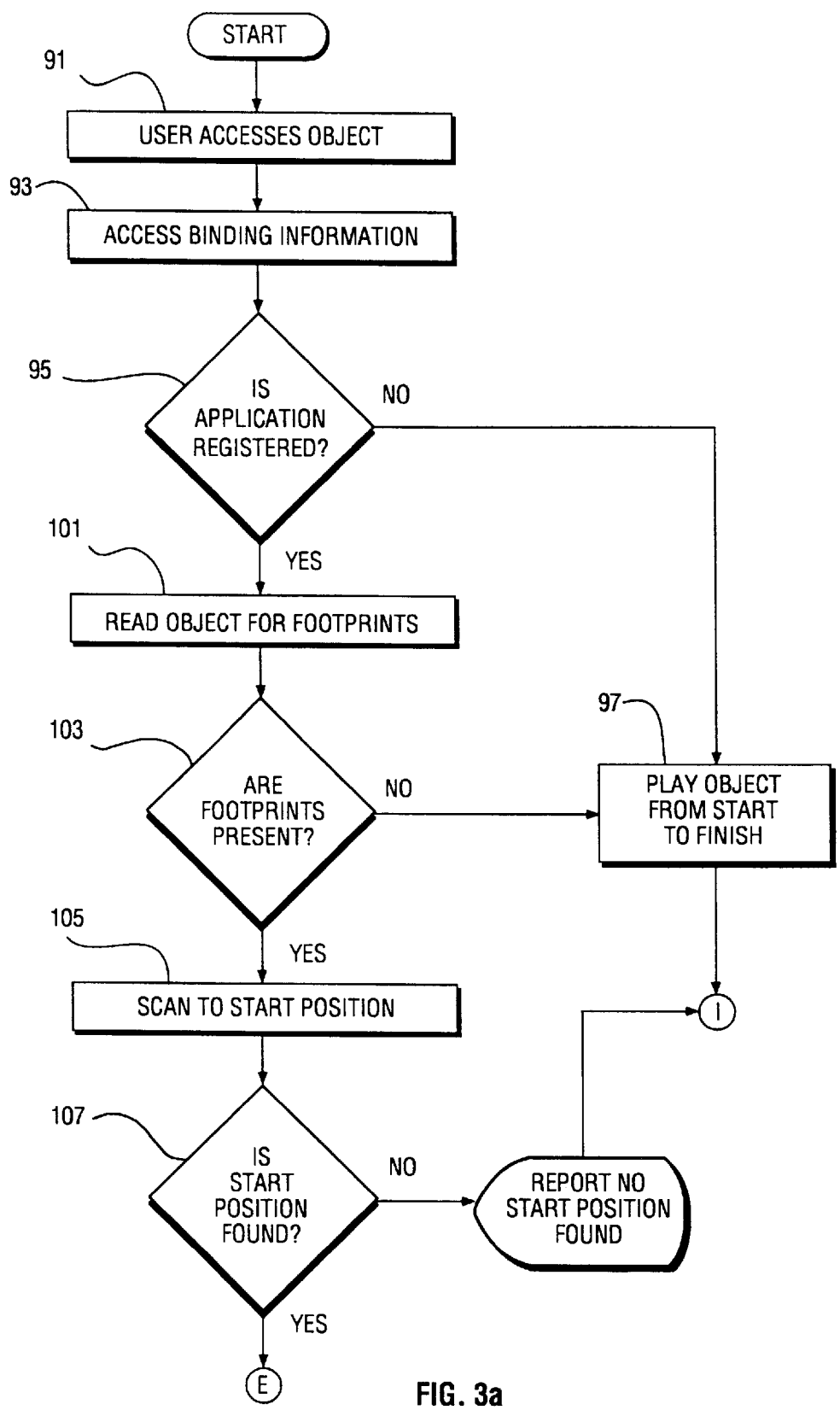
FIGS. 3a–3c show the activation method.
Figure 3B:
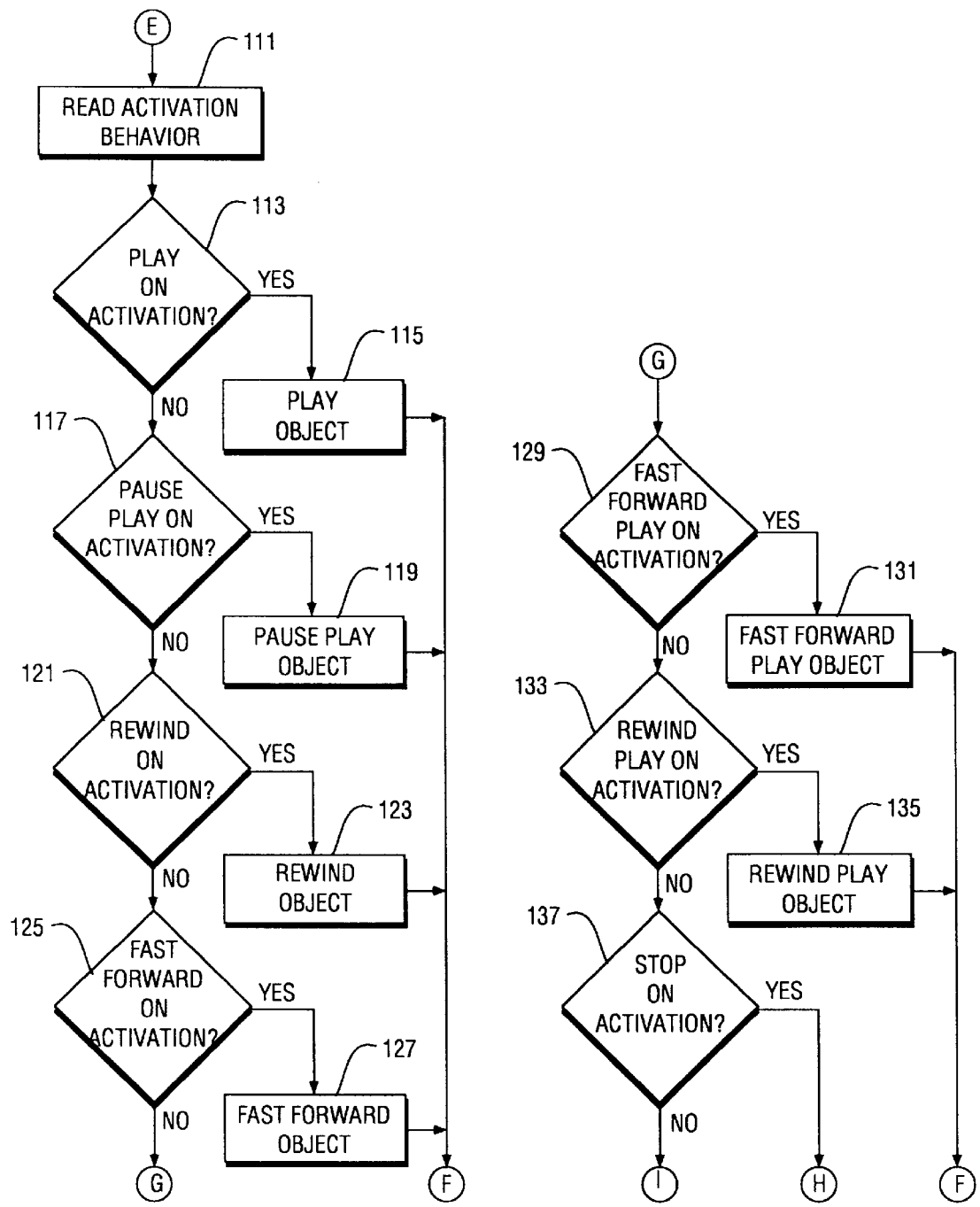
Figure 3C:
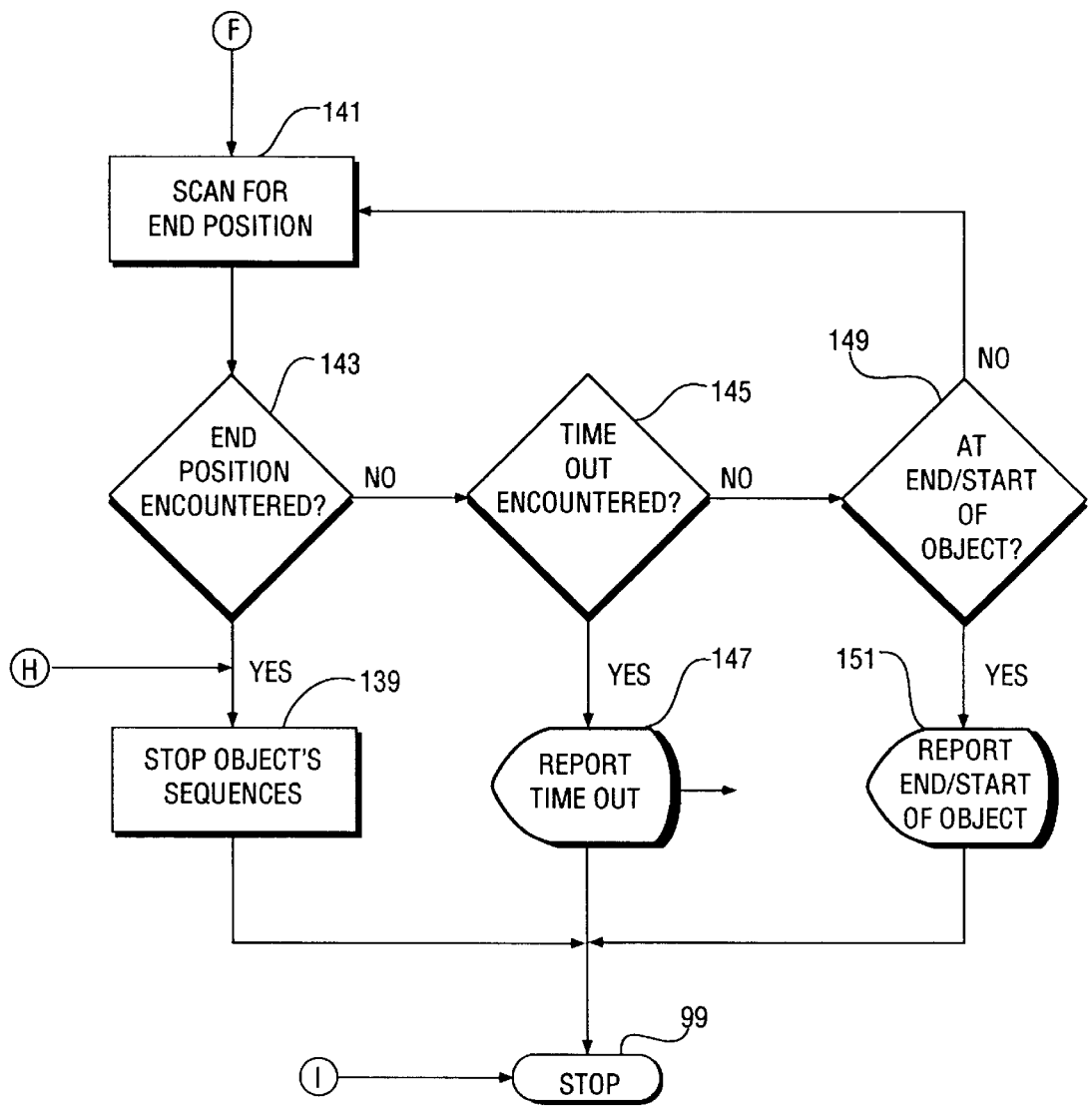

After the object has been distributed to the appropriate context, the method of FIGS. 3a–3c is used to activate the object. In step 91 of FIG. 3a, the recipient user accesses the object. This can be achieved by selecting the object from, for example, the calendar application. Selection occurs, for example, by the user placing a mouse cursor on the representation or icon of the object, and the pressing of a mouse button. In step 93, the binding information for the selected object is accessed. In step 95, the method determines if the application (for example a calendar application) is registered. If the result of step 95 is NO, then in step 97, the object is played from start (from the beginning of the data stream) to finish. In other words, the object is played normally as a default. After step 97, the method proceeds to step 99, FIG. 3c (by way of connector "I"). In step 99, the method stops.

If the result of step 95, FIG. 3a, is YES, then the footprints for the object are read, step 101. In step 103, the method determines if there are any footprints present. If the result of step 103 is NO, then the object is played normally, step 97. If the result of step 103 is YES, then the object is scanned to the start position of the data stream (as specified in step 37 of FIG. 2a), step 105. In step 107, the method determines if the start position is found. If the result of step 107 is NO, then the method reports to the user that no start user is found, step 109 and the method stops, step 99, FIG. 3c.

If the result of step 107 is YES, then the method proceeds to step 111 of FIG. 3b (by way of connector "E"). In step 111, the method reads the activation behavior. The activation behavior is read from either the binding or the footprints at the start position in the object data stream.

In the steps following step 111, the type of behavior is determined, and, once determined, is executed. In step 113, the method determines if the behavior is play on activation. If the result of step 113 is YES, then the method plays the object, beginning at the start position, step 115. If the result of step 113 is NO, then the method determines if the behavior is pause play on activation, step 117. If the result of step 117 is YES, then the method executes pause play on the object at the starting position, step 119. If the result of step 117 is NO, then the method proceeds to step 121 to determine if the behavior is rewind on activation. If the result of step 121 is YES, then in step 123, the object is rewound from the starting position. As those skilled in the art would recognize, the object could also be rewound from its current position in the data stream. If the result of step 121 is NO, then the method proceeds to step 125 to determine if the behavior is fast forward on activation. If the result of step 125 is YES, then the object is fast forwarded from the starting position, step 127. If the result of step 125 is NO, then the method proceeds to step 129 (by way of connector "G") to determine if the behavior is fast forward play on activation. If the result of step 129 is YES, then in step 131 the object is played in fast forward from the starting position. If the result of step 129 is NO, then the method proceeds to step 133 to determine if the behavior is rewind play on activation. If the result of step 133 is YES, then in step 135, the method plays the object while rewinding from the starting position. If the result of step 133 is NO, then the method proceeds to step 137 to determine if the behavior is stop on activation. If the result of step 137 is YES, then the method proceeds to step 139 of FIG. 3c, by way of connector "H". In step 139, the method stops the object's sequences to stop the presentation of the object. After step 139, the method stops, step 99.

Referring to FIG. 3b, if the result of step 137 is NO, then the method proceeds to step 99 in FIG. 3c, by way of connector "I". In step 99, the method stops.

After performing steps 115, 119, 123, 127, 131 or 135 of FIG. 3b, the method proceeds to step 141 (by way of connector "F") of FIG. 3c, to determine when to stop playing (including normal play, fast forward, play and rewind play), pausing, rewinding or fast forwarding. In step 141, the method scans for the end position in the data stream. In step 141, a short segment of the object's data stream is scanned, after which the method proceeds to step 143. If the data stream is being presented in a forward direction, such as with normal play or fast forward play, then scanning is in the forward direction. If the data stream is being presented in a reverse direction, such as with rewind play, then scanning is in the reverse direction. In step 143, the method determines if the end position has been found as specified in the data stream. If the result of step 143 is YES, then in step 139, the presentation of the object is stopped. For example, when playing a video clip starting at 5 minutes from the beginning of the object and ending 6 minutes from the beginning of the object, step 115 of FIG. 3b causes the video clip to be played. One minute into the presentation (or at 6 minutes from the beginning of the object) the end is scanned and encountered, steps 141–143, and the presentation stops, step 139. As another example, if the video clip is played backwards from 5 minutes to 4 minutes (from the beginning of the object), then the object is rewind played starting at 5 minutes and ending at 4 minutes.

If the result of step 143 is NO, then in step 145, the method determines if a time out has been encountered. A time out is useful for pause play where an end position is impractical because the presentation of data is static. That is, the same data is scanned over and over again in step 141 because the data stream has paused. If the result of step 145 is YES, then in step 147 the time out is reported to the user and the method stops, step 99, thereby ending the presentation of the object. An example of a time out would be 30 seconds. After 30 seconds, the pause play presentation stops.

If the result of step 145 is NO, then in step 149, the method determines if the presentation has reached the end (for forward presentations) or the start (for rewind presentations) of the object. If the result of step 149 is YES, then in step 151, the end/start of the object is reported to the user and the presentation stops, step 99.

If the result of step 149 is NO, then the method returns to step 141 to continue scanning.

The method of FIG. 4 will now be described. The method of FIG. 4 illustrates the distribution or placement of an object within specific contexts. Three examples of contexts are given in FIG. 4. These are distribution of an object by electronic mail service, distribution or placement to a calendar application (whether it is to a recipient user or to the distributing user) and distribution or placement to a player or output device. After the object has been distributed or placed to a context, the method of FIG. 5 is used to determine if the activation controls associated with the object can be supported by the context, and if so, starts the activation method of FIGS. 3a–3c.

In step 161 of FIG. 4, the method is started when invoked by the originating user. Invocation can occur when the object is to be distributed to or otherwise placed in the desired context. In step 163, the method determines if the distributing user provides a request to send the object by an electronic mail service. If the result of step 163 is YES, then in step 165, the method determines if the electronic mail service supports the activation controls on the object. These activation controls were provided during the registration method of FIGS. 2a–2c. If the result of step 165 is YES, then in step 167, the user selects the destination. In the example given above, one of the destinations is computer 13A. Selection of the destination includes providing sufficient information so as to identify the designated computer as well as the designated context. For example, if the object is sent to the recipient's inbasket, then this is specified. In step 169, the activation controls are bound to the distribution as an attribute. In step 171, the object, together with the activation controls, is sent to the recipient user (or users). In step 173, the method stops.

Returning to step 165, if the result of step 165 is NO, the electronic mail service does not support the activation control, then this is reported, step 175, and the method stops, step 173.

If the user does not request to send the object using the electronic mail service, then the result of step 163 is NO, and the method proceeds to step 177. In step 177, the method determines if the user requests to post the object to a calendar application. If the result of step 177 is YES, then in step 179, the method determines if the calendar application supports the activation control on the object. If the result of step 179 is NO, then the method proceeds, by way of connector "J", to step 173 at the bottom of FIG. 4, wherein the method stops. However, if the result of step 179 is YES, then in step 181, the distributing user selects the specific user calendar to which the object is to be sent. In step 183, a calendar authority table for the specific selected user calendar is accessed. The calendar authority table restricts access to a particular user's calendar for reasons of security, privacy, etc. In step 185, the method determines if the distributing user has authority to access the receiving user's calendar. This is accomplished by determining if the distributing user's name or identification is contained within the calendar authority table. If the result of step 185 is NO, then an error is reported to the distributing user, step 187, and the method stops, step 173. If the result of step 185 is YES, then the object is posted to the specified calendar and the posting event is bound to the calendar. Thus, when the calendar is opened, the object will be located in the calendar (for example, on a specific day or at a specific time). After step 189, the method stops, step 173.

Returning to step 177, if the result of step 177 is NO, wherein the user does not wish to post the object to a calendar, then the method proceeds to step 191. In step 191, the method determines if the user requests to associate the object to a player, such as a video monitor or an audio speaker. If the result of step 191 is NO, then in the embodiment illustrated in FIG. 4, the method reports that the application is not supported, step 175, and the method stops, step 173.

If the result of step 191 is YES, then in step 193, the user selects the desired player. This includes providing suitable identifying information on the particular player. In step 195, the activation control is associated to the player for the instance (or occurrence) of the particular object of interest. After step 189, the method stops, step 173.

Applications other than a calendar, electronic mail and a player can be included in the set of applications or services shown in FIG. 4 that distribute or place an object into a desired context.

The method of FIG. 5 is now be described. The method of FIG. 5 is used to determine if the context containing the object supports the activation controls and to invoke the activation method of FIGS. 3a–3c. The method of FIG. 5 is started, step 201, when a recipient user selects the object in its context. In order to follow the examples of the contexts provided in FIG. 4, FIG. 5 provides the following exemplary contexts: an inbasket (for receiving electronic mail distributions), a calendar and a player (or output device).

In step 203, the method determines if the recipient user has provided a request to open an inbasket object. Opening an inbasket object is accomplished by the user selecting a representation of the object on the display. The selected object is located inside of the inbasket interface (for example, a panel or window). If the result of step 203 is YES, then in step 205, the method determines if there are any activation controls present, which controls are associated with the selected object. If the result of step 205 is NO, then in step 207, the control of the object is passed to the electronic mail service. The object is then processed in the conventional manner with the mail service. Thus, the object is played from the beginning of the data stream forward until stopped either by the end of the data stream or by a stop command provided by the user. After step 207, the method proceeds, by way of connector "K", to step 209 (at the bottom of FIG. 5), wherein the method stops.

If the result of step 205 is YES, then in step 211, the access control that is associated with the selected object is read. The access control is established by the recipient user and may take the form of a table of those users who have access to provide edited objects. In step 213, the method determines if the activation process is permitted. For example, a determination is made if the recipient's inbasket service supports the activation controls such as rewind, fast forward, etc., and if the recipient user has authorized another user (the distributing user) to control the presentation of the object. The recipient user may wish to block out some or all activation controls or distributing users. If the result of step 213 is NO, then an error is reported to the recipient user, step 215, and the method stops, step 209.

If the result of step 213 is YES, then in step 217, the activation process of FIGS. 3a–3c is started or called. After step 217, the method of FIG. 5 ends.

Returning to step 203 of FIG. 5, if the result of this step is NO, then the method proceeds to step 219. In step 219, the method determines if the recipient user has requested to open a calendar object. Opening a calendar object is accomplished by the user selecting the object while using the calendar application. If the result of step 219 is YES, then in step 221, the method determines if an activation control is present in the object. If the result of step 221 is YES, then the method proceeds to steps 211 and 213 to determine if the activation process is permitted. If the activation process is permitted, then the method starts the activation process for the calendar object in step 217.

If the result of step 221 is NO, there is no activation control present, then control of the object is passed to the calling application (for example the calendar application), step 223. The object is then displayed in accordance with conventional techniques. The method stops, step 209.

Returning to step 219, if the result of this step is NO, then the method proceeds to step 225. In step 225, the method determines if the recipient user has requested to access an object associated with the player. If the result of step 225 is YES, then the method proceeds to step 221. If the results of steps 221 and 213 are both YES, then the object will be played on the selected player in accordance with the activation controls.

If the result of step 225 is NO, then the method stops, step 209. Other applications or contexts could be provided for in the method of FIG. 5. Thus, the method of FIG. 5 need not be limited to an inbasket, calendar and a player.

The foregoing disclosure and the showings made in the drawings are merely illustrative of the principles of this invention and are not to be interpreted in a limiting sense.

What we claim is:

1. A computer implemented method of presenting a temporal based object on a data processing system, said object having a content comprising the steps of:
   a) determining a context on said data processing system for presenting said object;

b) providing presentation characteristics of said object for said context, said presentation characteristics comprising a selection of a portion of said content of said object, said portion being less than all of said content, and associating said presentation characteristics with said object;

c) distributing said presentation characteristics and all of said content of said object to said context;

d) determining if said object is to be presented through said context; and e) if said object is to be presented through said context, then presenting said object through said context in accordance with said presentation characteristics.

2. The method of claim 1 wherein said context comprises an application program, said step of determining if said object is to be presented through said context further comprises the step of determining if said object is to be presented through said application program.

3. The method of claim 1 wherein said context comprises an output device of said data processing system, said step of determining if said object is to be presented through said context further comprises the step of determining if said object is to be presented through said output device.

4. The method of claim 1 wherein said object has a data stream for presentation to a user, wherein said step of providing presentation characteristics of an object further comprises the step of selecting a segment of said data stream.

5. The method of claim 4, wherein said data stream is presented at a speed and in a direction of said data stream, said step of providing presentation characteristics of said object further comprises the step of determining how said segment of said data stream is to be presented in terms of either presentation speed of said data stream segment or direction of said data stream segment.

6. The method of claim 5, wherein said step of determining how said segment of said data stream is to be presented further comprises the step of providing a presentation behavior of said segment, said presentation behavior taken from the group of behaviors consisting of play, pause play, rewind, fast forward, rewind play, fast forward play and stop play.

7. The method of claim 1, wherein said object comprises data that is presented at a speed and with a direction, said step of providing presentation characteristics of said object further comprises the step of determining how said object is to be presented in terms of either presentation speed of said data or direction of said data.

8. The method of claim 1, further comprising the step of, before presenting said object in accordance with said presentation characteristics, determining if the steps of determining a context for presenting said object and providing presentation characteristics of said object and associating said presentation characteristics with said object have been authorized.

9. The method of claim 1, further comprising the step of:

a) said step of providing presentation characteristics of said object for said context further comprises the step of providing that said object will be presented in a pause play mode;

b) said step of presenting said object in accordance with said presentation characteristics further comprises the step of presenting said object An said pause play mode; and c) after a predetermined amount of time has elapsed, stopping said presentation of said object.

10. The method of claim 1 wherein said step of distributing said object to said context further comprises the step of using an electronic mail service to send said object to said data processing system.

11. The method of claim 1 wherein said step of distributing said object to said context further comprises the step of posting said object to an application program so that said object is presented on a user interface of said application program.

12. The method of claim 1 wherein the step of distributing said object to said context further comprises the step of associating said presentation characteristics to an output device of said data processing system for an instance of said object.

13. A computer implemented method for presenting a temporal based object on a data processing system, said object having a content, comprising the steps of:

a) at a first data processing system, determining a context for presenting said object, providing presentation characteristics of said object for said context, said presentation characteristics comprising a selection of a portion of said content of said object, said portion being less than all of said content, and associating said presentation characteristics with said object;

b) distributing all of said content of said object to a second data processing system;

c) at said second data processing system, determining if said object is to be presented through said context; and d) if said object is to be presented through said context, then presenting said object through said context in accordance with said presentation characteristics on said second data processing system.

14. A system of presenting a temporal based object on a data processing system, said object having a content, comprising:

a) means for determining a context on said data processing system for presenting said object;

b) means for providing presentation characteristics of said object for said context, said presentation characteristics comprising a selection of a portion of said content of said object, aid portion being less than all of said content, and for associating said presentation characteristics with said object;

c) means for distributing said presentation characteristics and all of said content of said object to said context;

d) means for determining if said object is to be presented through said context; and e) means for presenting said object through said context in accordance with said presentation characteristics if said object is to be presented through said context.

15. The system of claim 14 wherein said context comprises an application program, said means for determining if said object is to be presented through said context further comprises means for determining if said object is to be presented through said application program.

16. The system of claim 14 wherein said context comprises an output device of said data processing system, said means for determining if said object is to be presented through said context further comprises means for determining if said object is to be presented through said output device.

17. The system of claim 14 wherein said object has a data stream for presentation to a user, wherein said means for providing presentation characteristics of an object further comprises means for selecting a segment of said data stream.

18. The system of claim 16, wherein said data stream is presented at a speed and in a direction of said data stream, said means for providing presentation characteristics of said object further comprises means for determining how said segment of said data stream is to be presented in terms of either presentation speed of said data stream segment or direction of said data stream segment.

19. The system of claim 17, wherein said means for determining how said segment of said data stream is to be presented further comprises means for providing a presentation behavior of said segment, said presentation behavior taken from the group of behaviors consisting of play, pause play, rewind, fast forward, rewind play, fast forward play and stop play.

20. The system of claim 14, wherein said object comprises data that is presented at a speed and with a direction, said means for providing presentation characteristics of said object further comprises means for determining how said object is to be presented in terms of either presentation speed of said data or direction of said data.

21. The system of claim 14, further comprising means for, before presenting said object in accordance with said presentation characteristics, determining if the provision of presentation characteristics of said object and the association of said presentation characteristics with said context have been authorized.

22. The system of claim 14, further comprising:
   a) said means for providing presentation characteristics of said object further comprises means for providing that said object will be presented in a pause play mode;
   b) said means for presenting said object in accordance with said presentation characteristics further comprises means for presenting said object in said pause play mode; and
   c) means for stopping said presentation of said object after a predetermined amount of time has elapsed.

* * * * *